(12) United States Patent
Sasaki et al.

(10) Patent No.: US 6,319,544 B1
(45) Date of Patent: Nov. 20, 2001

(54) MANUFACTURING METHOD OF MAGNETORESISTIVE EFFECT SENSOR AND MANUFACTURING METHOD OF MAGNETIC HEAD WITH THE SENSOR

(75) Inventors: Tetsuro Sasaki; Hiroaki Kawashima, both of Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/472,837

(22) Filed: Dec. 28, 1999

(30) Foreign Application Priority Data

Jan. 11, 1999 (JP) .................................................. 11-004062

(51) Int. Cl.[7] ....................................................... B05D 5/12
(52) U.S. Cl. .......................... 427/131; 427/132; 427/264; 427/270; 427/271; 427/372.2; 427/383.1; 427/404; 427/548; 427/599
(58) Field of Search ..................................... 427/131, 132, 427/548, 599, 264, 270, 271, 372.2, 383.1, 404

(56) References Cited

U.S. PATENT DOCUMENTS 5,761,010 * 6/1998 Mimura .

* cited by examiner

Primary Examiner—Bernard Pianalto
(74) Attorney, Agent, or Firm—Arent Fox Kintner Plotkin & Kahn, PLLC

(57) ABSTRACT

A method of manufacturing a MR sensor having at least an anti-ferromagnetic layer and a ferromagnetic layer, and to a method for manufacturing a magnetic head with the MR sensor. The sensor utilizes bias magnetic field provided by exchange coupling between the anti-ferromagnetic layer and the ferromagnetic layer. The sensor manufacturing method includes a step of depositing an anti-ferromagnetic layer to have a larger thickness than a target thickness, a step of ordering the deposited anti-ferromagnetic layer, and a step of thinning the ordered anti-ferromagnetic layer to have the target thickness.

10 Claims, 9 Drawing Sheets

3kOe 250° 10 HOURS
22°C/HOUR→80°C

MANUFACTURING METHOD OF MAGNETORESISTIVE EFFECT SENSOR AND MANUFACTURING METHOD OF MAGNETIC HEAD WITH THE SENSOR

FIELD OF THE INVENTION

The present invention relates to a method of manufacturing a magnetoresistive effect (MR) sensor utilizing the giant magnetoresistive effect (GMR) and to a method of manufacturing a magnetic head with the MR sensor, used for a magnetic recording and reproducing device such as a hard disc drive (HDD) unit.

DESCRIPTION OF THE RELATED ART

Recently, thin-film magnetic heads with MR sensors based on spin valve effect of GMR characteristics are proposed in order to realize high sensitivity and high power magnetic heads which will satisfy the requirement for ever increasing data storage densities in today's HDD units.

The spin valve effect will be obtained by a structure with first and second thin-film layers of a ferromagnetic material separated by a thin-film layer of non-magnetic and electrically conductive material, and an adjacent layer of anti-ferromagnetic material formed in physical contact with the second ferromagnetic layer to provide exchange bias magnetic field by exchange coupling at the interface of the layers. The magnetization direction in the second ferromagnetic layer is constrained or maintained by the exchange coupling, hereinafter the second layer is called "pinned layer". On the other hand the magnetization direction of the first ferromagnetic layer is free to rotate in response to an externally applied magnetic field, hereinafter the first layer is called "free layer". The direction of the magnetization in the free layer changes between parallel and anti-parallel against the direction of the magnetization in the pinned layer, and hence the magneto-resistance greatly changes and GMR characteristics are obtained.

The output characteristic of the spin valve effect MR sensor depends upon the angular difference of magnetization between the free and pinned ferromagnetic layers. The direction of the magnetization of the free layer is free to rotate in accordance with an external magnetic field such as a leakage magnetic field from a magnetic recording medium. That of the pinned layer is fixed to a specific direction (called as "pinned direction") by the exchange coupling between this layer and adjacently formed anti-ferromagnetic layer.

In order to provide an exchange coupling between the pinned layer and the adjacently formed anti-ferromagnetic layer made of ordered anti-ferromagnetic material, it is necessary to give the anti-ferromagnetic layer an crystal structure of the CuAu—I type by executing ordering heat treatment on a deposited anti-ferromagnetic layer under application of magnetic field.

The output characteristics of the spin valve effect MR sensor with such ordered anti-ferromagnetic layer will be improved if the thickness of the anti-ferromagnetic layer becomes thinner. Namely, in the spin valve effect MR sensor, since the anti-ferromagnetic layer and the ferromagnetic layers are connected in parallel with the conductor layer for passing the sense current, it is necessary to make the thickness of the anti-ferromagnetic layer and the ferromagnetic layers thin to increase their resistance. If the resistance of the anti-ferromagnetic layer and the ferromagnetic layers increases, the divided current passing through these layers decreases and thus a rate of the output resistance change increases. Since the thickness of the anti-ferromagnetic layer will have in general extremely greater than that of the ferromagnetic layers, it is effective to form a thinner anti-ferromagnetic layer in order to decrease the divided current passing through these layers.

In addition, since it is requested that the magnetic head has a narrower recording gap to satisfy the requirement for increasing data storage density in the recent HDD unit, the thickness of the anti-ferromagnetic layer has to decrease more.

In the spin valve effect MR sensor, the energy of the exchange coupling for magnetizing the ferromagnetic layer toward one direction will increase if the thickness of the anti-ferromagnetic layer increases. Thus, conventionally the anti-ferromagnetic layer has been designed to have a relatively large thickness such as 25 nm or more.

If the thickness of the anti-ferromagnetic layer becomes thicker than 25 nm, the MR changing rate and the sheet-resistance value of the spin valve effect sensor become low. Thus, the rate of the output resistance change of the sensor decreases under the influence of low MR changing rate and low sheet-resistance value. Also, if the thickness of the anti-ferromagnetic layer becomes thinner than 5 nm, the MR changing rate of the sensor abruptly decreases and therefore the rate of the output resistance change suddenly decreases.

As mentioned above, requirement for lowering of the divided sense current passing through the anti-ferromagnetic layer and the ferromagnetic layers and requirement for increasing of the exchange-coupling energy conflict with each other with respect to the thickness of the anti-ferromagnetic layer. Since these requirements are fundamental requirements for the spin valve effect sensor, it is very important to satisfy both of these requirements.

SUMMARY OF THE INVENTION

It is therefore an object of the present invention to provide a manufacturing method of a MR sensor and a manufacturing method of a magnetic head with the MR sensor, whereby exchange-coupling energy can be increased without increasing the thickness of an anti-ferromagnetic layer.

The present invention relates to a method for manufacturing a MR sensor having at least an anti-ferromagnetic layer and a ferromagnetic layer, and to a method for manufacturing a magnetic head with the MR sensor. The sensor utilizes bias magnetic field provided by exchange coupling between the anti-ferromagnetic layer and the ferromagnetic layer. The sensor manufacturing method includes a step of depositing an anti-ferromagnetic layer to have a larger thickness than a target thickness, a step of ordering the deposited anti-ferromagnetic layer, and a step of thinning the ordered anti-ferromagnetic layer to have the target thickness.

The anti-ferromagnetic layer deposited to have a larger thickness than a target thickness is ordered and thereafter thinned to have the target thickness. Thus, it is possible to obtain a multi-layered MR structure with a larger exchange-coupling energy than that of a multi-layered MR structure in which an anti-ferromagnetic layer is deposited to have the target thickness from the beginning and ordered. As a result, the exchange-coupling energy between the ferromagnetic layer and the anti-ferromagnetic layer of the multi-layered MR structure can be increased without changing or increasing the thickness of the anti-ferromagnetic layer so as to keep the divided sense current passing through the anti-ferromagnetic layer at almost the same value and so as to maintain the output characteristics of the MR sensor.

Japanese unexamined patent publication No.9-69210 discloses that anti-ferromagnetic layers for magnetic domain control are etched to have a thickness so that the anti-ferromagnetic layers become magnetically inactive. Namely, in the publication, it is described that the anti-ferromagnetic layers are thinned by ion milling to destroy the magnetic exchange coupling between these anti-ferromagnetic layers and the MR layer so as to use them layers as protection layers of the MR layer. Thus, thinning of the anti-ferromagnetic layers is not executed to improve the exchange coupling but just opposite to that of the present invention. Therefore, there is no teaching in the publication that the anti-ferromagnetic layer is deposited to have a larger thickness than a target thickness, then ordered and thereafter thinned to have the target thickness.

It is preferred that the thinning step includes thinning the ordered anti-ferromagnetic layer by a thinning amount of 5 nm or more.

It is preferred that the anti-ferromagnetic layer is made of a Mn-containing compound with the CuAu—I type ordered crystal structure. In this case, preferably, the ordered anti-ferromagnetic layer is oriented along (111) crystal alignment face after the ordering.

It is preferred that the anti-ferromagnetic layer is made of PtMn, or made of an alloy containing 80 at % or more of PtMn and additive of at least one of Ru, Rh, Pd, Au, Ag, Fe and Cr. In this case, preferably, content of Mn in PtMn is 40 to 60 at %.

It is also preferred that the anti-ferromagnetic layer is made of NiMn, or made of 80 at % or more of NiMn and additive of at least one of Ru, Rh, Pd, Au, Ag, Fe and Cr. In this case, preferably, content of Mn in NiMn is 40 to 60 at %.

Further objects and advantages of the present invention will be apparent from the following description of the preferred embodiments of the invention as illustrated in the accompanying drawings.

DESCRIPTION OF THE PREFERRED EMBODIMENTS

Figure 1:
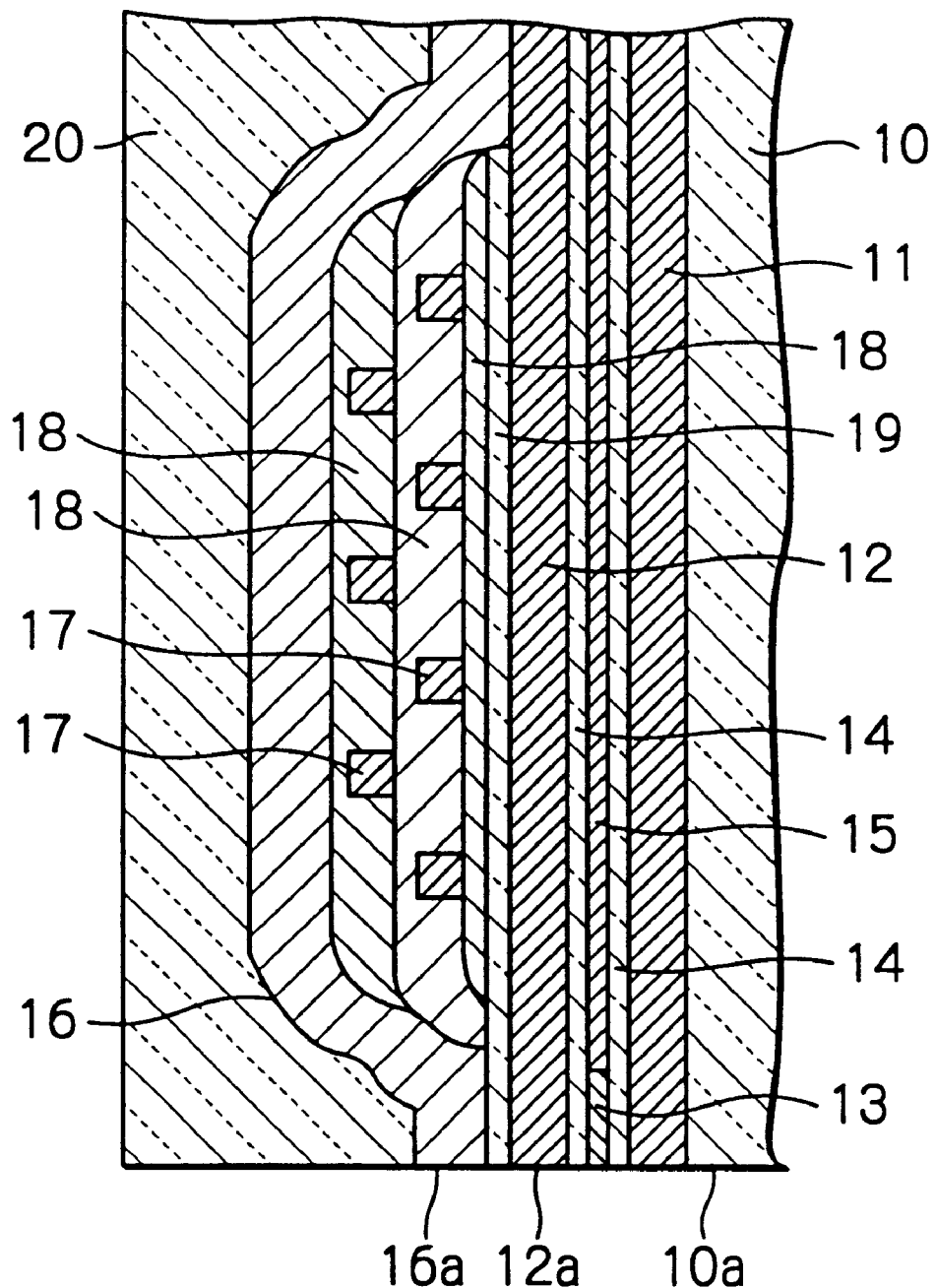
FIG. 1 is a cross-sectional view schematically illustrating a fundamental configuration of a thin-film magnetic head fabricated by a manufacturing method in a preferred embodiment according to the present invention.
Figure 2:
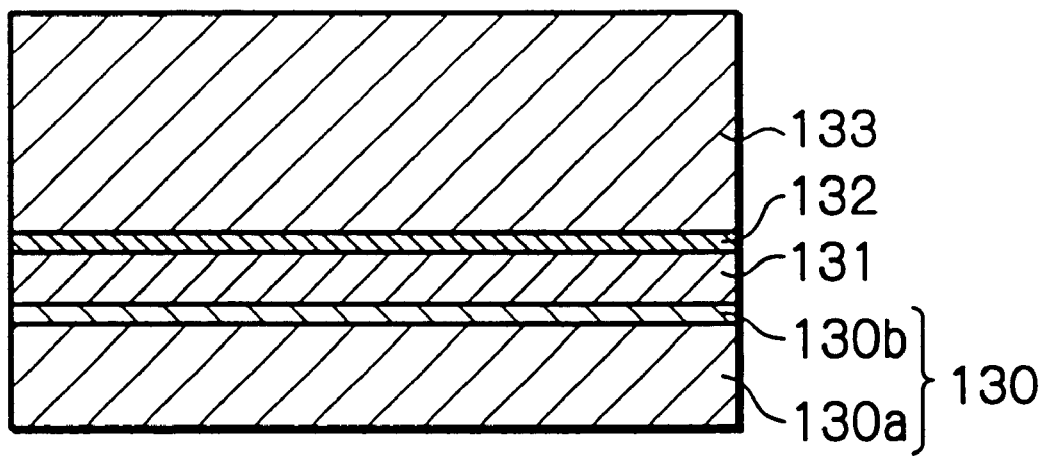
FIG. 2 is a cross-sectional view seen from the air-bearing surface (ABS) illustrating layer structure of a MR sensor part of the magnetic head shown in FIG. 1.

FIG. 1 schematically illustrates a fundamental configuration of a thin-film magnetic head fabricated by a manufacturing method in a preferred embodiment according to the present invention, and FIG. 2 illustrates layer structure of a MR sensor part of the magnetic head shown in FIG. 1.

The magnetic head of this embodiment is a composite type thin-film magnetic head with a reading head part consisting of a MR sensor and a writing head part consisting of an inductive magnetic transducer element.

In FIG. 1, reference numeral 10 denotes a substrate which constitutes a base of a slider, 11 a lower shield layer formed on an under layer (not shown) which is deposited on the substrate 10, 12 an upper shield layer which also operates as a lower magnetic layer of the writing head part, 13 a spin valve multi-layered structure formed between the lower shield layer 11 and the upper shield layer 12 via insulation layers 14 and 15 so as to run along an ABS 10a, 16 an upper magnetic layer, 17 coil conductor layers surrounded by insulation layers 18 made of organic resin, 19 a gap layer and 20 a protection layer, respectively.

Top end portions of the lower and upper magnetic layers 12 and 16 constitute writing magnetic poles 12a and 16a that oppose to each other through the gap layer 19 with a minute thickness. Back gap parts of the lower and upper magnetic layers 12 and 16 that constitute a yoke are jointed with each other so as to complete a magnetic circuit. The coil conductor layers 17 are formed on the insulation layers 18 so as to turn spirally around the joint part of the yoke.

As shown in FIG. 2, the spin valve multi-layered structure 13 has soft magnetic layers 130a and 130b that constitute a first ferromagnetic layer or a free layer 130, a nonmagnetic conductive layer 131, a second ferromagnetic layer or a pinned layer 132 and an anti-ferromagnetic layer 133, multi-layered in this order.

Although the first ferromagnetic layer 130 has a double-layered structure of the soft magnetic layers 130a and 130b in this embodiment, this layer 130 may be formed by a single layer structure or a multi-layered structure with three or more layers. A NiFe film with a thickness of about 7 nm for example may be constitute the magnetic layer 130a, and a Co film with a thickness of about 1 nm for example may constitute the magnetic layer 130b.

One surface of the nonmagnetic conductive layer 131 is in contact with one surface of the soft magnetic layer 130b. A Cu film with a thickness of about 3 nm for example may constitute this conductive layer 131.

One surface of the second ferromagnetic layer 132 is in contact with the other surface of the nonmagnetic conductive layer 131. A Co film with a thickness of about 2 nm for example may constitute this ferromagnetic layer 132.

The anti-ferromagnetic layer 133 is constituted by a Mn-containing compound that is an ordered anti-ferromagnetic material. The Mn-containing compound has the CuAu—I type ordered crystal structure, is oriented along (111) crystal alignment face after ordering and has a thickness equal to or thicker than about 5 nm. The second ferromagnetic layer 132 is exchange-coupled with the anti-ferromagnetic layer 133 and magnetized toward one direction by the exchange coupling.

Although it is not shown in FIG. 2, an under film is formed under the soft magnetic layer 130a and a protection film is formed on the anti-ferromagnetic layer 133. At the both end edges of the spin valve multi-layered structure, magnetic domain control layers for providing longitudinal magnetic bias to the first ferromagnetic layer 130 are formed. The magnetic domain control layers may be permanent magnet layers or anti-ferromagnetic layers for providing exchange coupling between these anti-ferromagnetic layers and the first ferromagnetic layer 130. Lead conductor layers for leading a sense current flowing through the nonmagnetic conductive layer 131 in the spin valve multi-layered structure will be formed on the respective magnetic domain control layers.

Described following is a manufacturing method of the spin valve MR sensor in this embodiment.

Figure 3A:
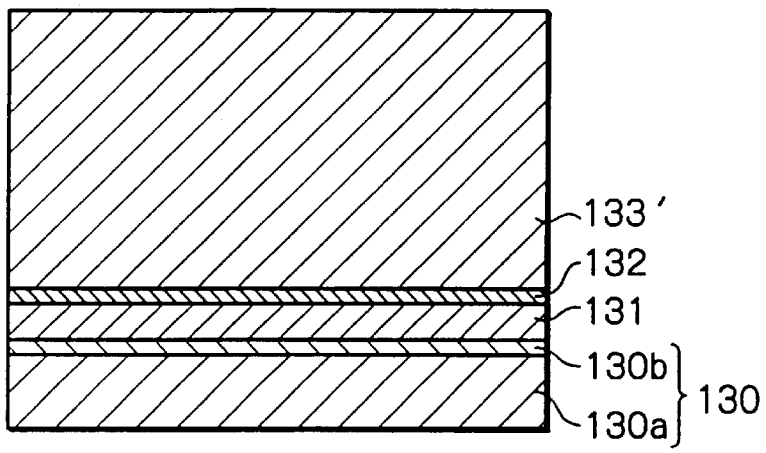
FIGS. 3a, 3b 3c illustrate the manufacturing method in the embodiment shown in FIG. 1; degradation of output characteristics of the SVMR element when its pinned direction rotates.

First, as shown in FIG. 3a, on the substrate, the soft magnetic layers 130a and 130b that constitute the first ferromagnetic layer or a free layer 130, the nonmagnetic conductive layer 131, the second ferromagnetic layer 132 and an anti-ferromagnetic layer 133' are sequentially deposited in this order. At this stage, the deposited anti-ferromagnetic layer 133' has a thickness greater than a target thickness of the completed anti-ferromagnetic layer 133.

In this embodiment, a NiFe layer with a thickness of about 7 nm constitutes the soft magnetic layer 130a, a Co layer with a thickness of about 1 nm constitutes the soft magnetic layer 130b, a Cu layer with a thickness of about 3 nm constitutes the nonmagnetic conductive layer 131, a Co layer with a thickness of about 2 nm constitutes the second ferromagnetic layer 132, and a Mn-containing compound layer with a thickness of about 100–300 nm constitutes the deposited anti-ferromagnetic layer 133', respectively.

Figure 3B:
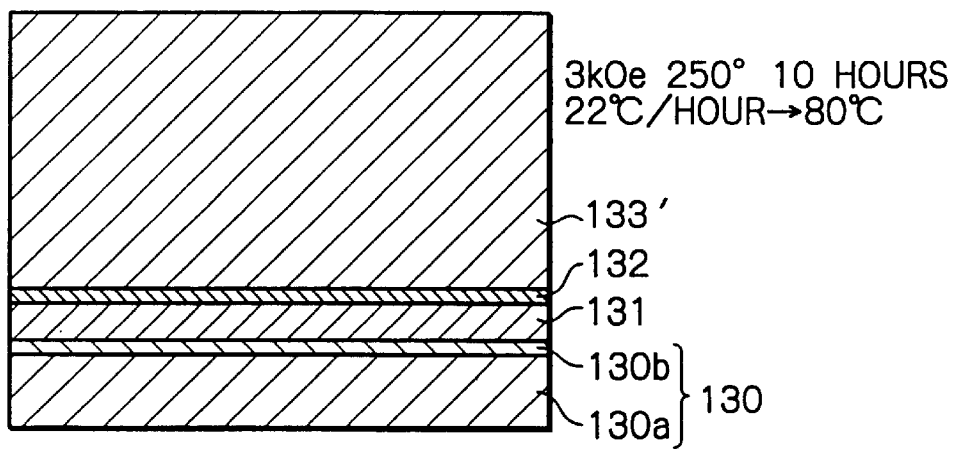

Then, as shown in FIG. 3b, the deposited anti-ferromagnetic layer 133' is ordered under application of heat and magnetic field. This ordering heat treatment is executed by heating the multi-layered structure (wafer) to keep temperature of 250° C. for 10 hours under application of magnetic field of 3 kOe and then by gradually cooling it to decrease the temperature to 80° C. at a rate of 22° C./hour under application of magnetic field of 3 kOe.

Figure 3C:
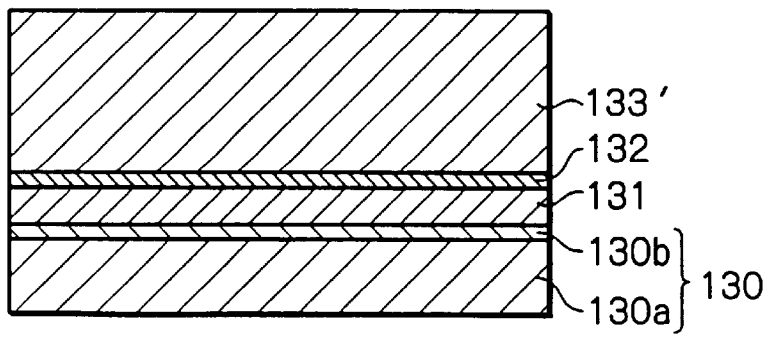

Thereafter, the ordered anti-ferromagnetic layer 133' is thinned by a reverse sputtering or by a dry etching such as ion milling or RIE (reactive ion etching), so that the anti-ferromagnetic layer 133 with a target thickness shown in FIG. 3c is obtained.

According to the present invention, an anti-ferromagnetic layer is deposited to have a larger thickness than a target thickness, then ordered and thereafter thinned to have the target thickness. Thus, it is possible to obtain a multi-layered MR structure such as a spin valve structure with a larger exchange-coupling energy than that of a multi-layered MR structure in which an anti-ferromagnetic layer is deposited to have the target thickness from the beginning and ordered. As a result, the exchange-coupling energy between the ferromagnetic layer and the anti-ferromagnetic layer of the multi-layered MR structure can be increased without changing or increasing the thickness of the anti-ferromagnetic layer so as to keep the divided sense current passing through the anti-ferromagnetic layer at almost the same value and so as to maintain the output characteristics of the MR sensor.

Hereinafter, measured results of the exchange-coupling magnetic field Hua of various examples of the spin valve MR sensors with respective anti-ferromagnetic layers made of different materials are described. In each example, various samples with the anti-ferromagnetic layers that have now the same target thickness but had different thickness values at deposition, in other words, were thinned by different values.

Each sample indicated as "with thinning process" in the examples was fabricated by depositing, on a substrate of AlTiC covered by an alumina film, Ta(5 nm)/NiFe(7 nm)/Co(1 nm)/Cu(3 nm)/Co(2 nm)/anti-ferromagnetic layer with a thickness larger than the target thickness were sequentially deposited in this order, by ordering with heat and magnetic field, by thinning the anti-ferromagnetic layer to the target thickness, and then by depositing Ta layer of 5 nm thickness. Each sample indicated as "without thinning process" in the examples was fabricated by depositing, on a substrate of AlTiC covered by an alumina film, Ta(5 nm)/NiFe(7 nm)/Co(1 nm)/Cu(3 nm)/Co(2 nm)/anti-ferromagnetic layer with the target thickness/Ta(5 nm) were sequentially deposited in this order, and then by ordering with heat and magnetic field.

FIRST EXAMPLE

Figure 4:
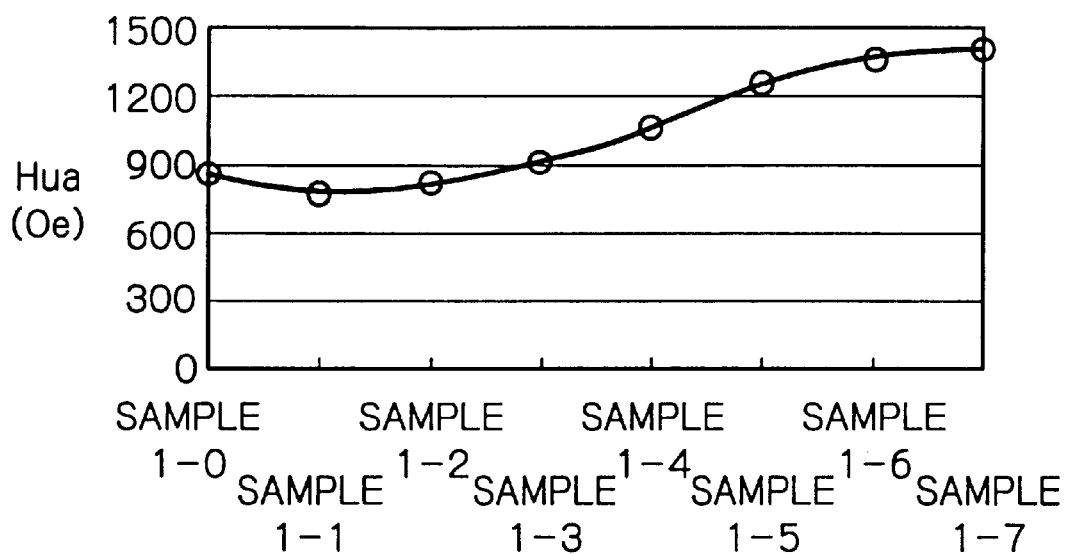
FIG. 4 is a graph illustrating results of measurement of exchange-coupling magnetic field Hua of various samples with anti-ferromagnetic layers having different thickness values at deposition.

FIG. 4 illustrates the measurement results of exchange-coupling magnetic field Hua of the various samples with anti-ferromagnetic layers of PtMn. The thickness values at deposition of the anti-ferromagnetic layers in the samples are indicated in Table 1. In this example, the target or final thickness of the anti-ferromagnetic layer was 30 nm, and the composition of PtMn was Pt—50 at % and Mn—50 at %.

TABLE 1

| | | Layer Structure at Deposition |
|---|---|---|
| Sample 1-0 | Without Thinning Process after Heat Treatment | Ta(5 nm)/NiFe(7 nm)/Co(1 nm)/Cu(3 nm)/Co(2 nm)/PtMn(30 nm)/Ta(5 nm) |

TABLE 1-continued

| | | Layer Structure at Deposition |
|---|---|---|
| Sample 1-1 | With Thinning Process after Heat Treatment | Ta(5 nm)/NiFe(7 nm)/Co(1 nm)/Cu(3 nm)/Co(2 nm)/PtMn(33 nm) |
| Sample 1-2 | With Thinning Process after Heat Treatment | Ta(5 nm)/NiFe(7 nm)/Co(1 nm)/Cu(3 nm)/Co(2 nm)/PtMn(34 nm) |
| Sample 1-3 | With Thinning Process after Heat Treatment | Ta(5 nm)/NiFe(7 nm)/Co(1 nm)/Cu(3 nm)/Co(2 nm)/PtMn(35 nm) |
| Sample 1-4 | With Thinning Process after Heat Treatment | Ta(5 nm)/NiFe(7 nm)/Co(1 nm)/Cu(3 nm)/Co(2 nm)/PtMn(40 nm) |
| Sample 1-5 | With Thinning Process after Heat Treatment | Ta(5 nm)/NiFe(7 nm)/Co(1 nm)/Cu(3 nm)/Co(2 nm)/PtMn(50 nm) |
| Sample 1-6 | With Thinning Process after Heat Treatment | Ta(5 nm)/NiFe(7 nm)/Co(1 nm)/Cu(3 nm)/Co(2 nm)/PtMn(60 nm) |
| Sample 1-7 | With Thinning Process after Heat Treatment | Ta(5 nm)/NiFe(7 nm)/Co(1 nm)/Cu(3 nm)/Co(2 nm)/PtMn(100 nm) |

SECOND EXAMPLE

Figure 5:
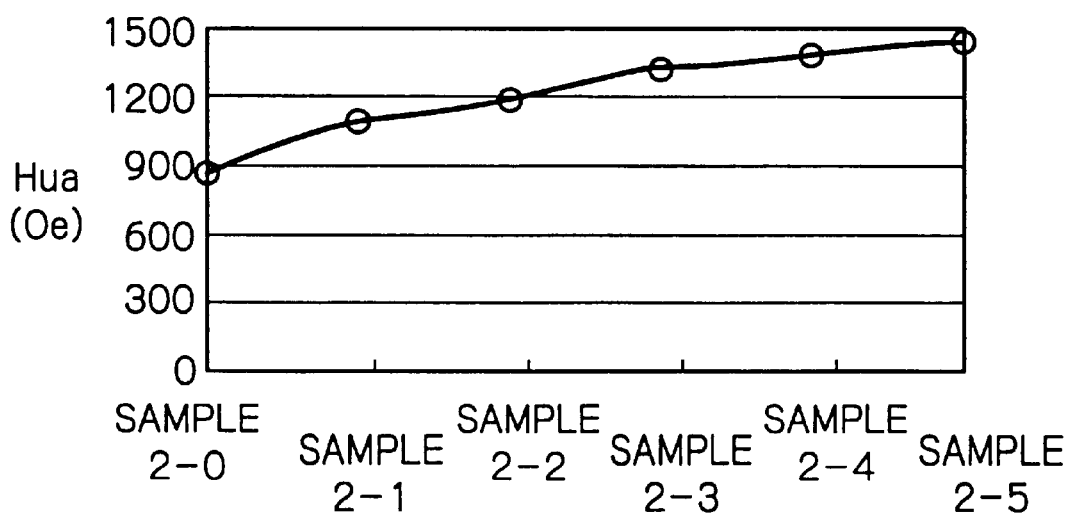
FIG. 5 is a graph illustrating results of measurement of exchange-coupling magnetic field Hua of various samples with anti-ferromagnetic layers having different thickness values at deposition.

FIG. 5 illustrates the measurement results of exchange-coupling magnetic field Hua of the various samples with anti-ferromagnetic layers of NiMn. The thickness values at deposition of the anti-ferromagnetic layers in the samples are indicated in Table 2. In this example, the target or final thickness of the anti-ferromagnetic layer was 15 nm, and the composition of NiMn was Ni—50 at % and Mn—50 at %.

TABLE 2

| | | Layer Structure at Deposition |
|---|---|---|
| Sample 2-0 | Without Thinning Process after Heat Treatment | Ta(5 nm)/NiFe(7 nm)/Co(1 nm)/Cu(3 nm)/Co(2 nm)/NiMn(15 nm)/Ta(5 nm) |
| Sample 2-1 | With Thinning Process after Heat Treatment | Ta(5 nm)/NiFe(7 nm)/Co(1 nm)/Cu(3 nm)/Co(2 nm)/NiMn(30 nm) |
| Sample 2-2 | With Thinning Process after Heat Treatment | Ta(5 nm)/NiFe(7 nm)/Co(1 nm)/Cu(3 nm)/Co(2 nm)/NiMn(40 nm) |
| Sample 2-3 | With Thinning Process after Heat Treatment | Ta(5 nm)/NiFe(7 nm)/Co(1 nm)/Cu(3 nm)/Co(2 nm)/NiMn(50 nm) |
| Sample 2-4 | With Thinning Process after Heat Treatment | Ta(5 nm)/NiFe(7 nm)/Co(1 nm)/Cu(3 nm)/Co(2 nm)/NiMn(60 nm) |
| Sample 2-5 | With Thinning Process after Heat Treatment | Ta(5 nm)/NiFe(7 nm)/Co(1 nm)/Cu(3 nm)/Co(2 nm)/NiMn(100 nm) |

THIRD EXAMPLE

Figure 6:
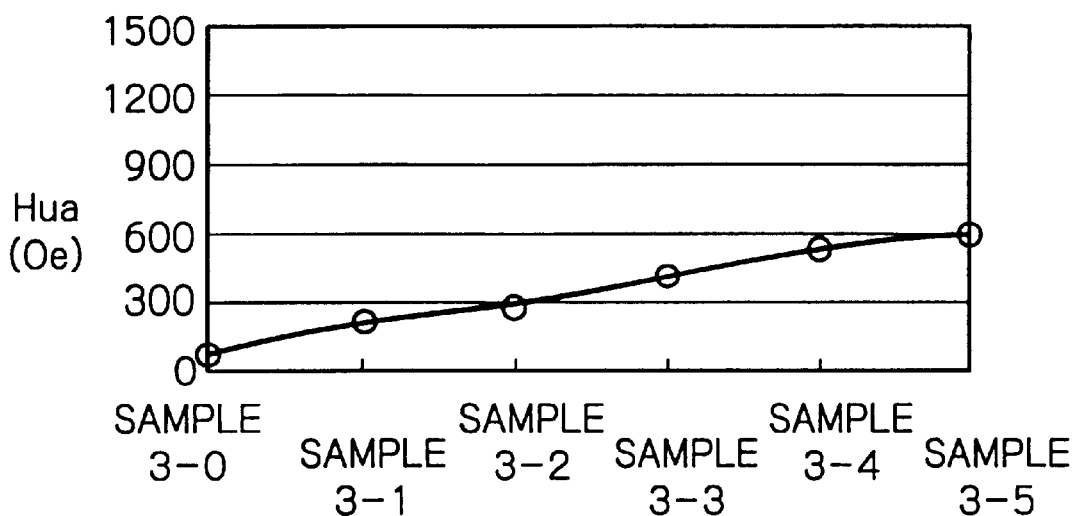
FIG. 6 is a graph illustrating results of measurement of exchange-coupling magnetic field Hua of various samples with anti-ferromagnetic layers having different thickness values at deposition.

FIG. 6 illustrates the measurement results of exchange-coupling magnetic field Hua of the various samples with anti-ferromagnetic layers of PtMn. The thickness values at deposition of the anti-ferromagnetic layers in the samples are indicated in Table 3. In this example, the target or final thickness of the anti-ferromagnetic layer was 5 nm, and the composition of PtMn was Pt—50 at % and Mn—50 at %.

TABLE 3

| | | Layer Structure at Deposition |
|---|---|---|
| Sample 3-0 | Without Thinning Process after Heat Treatment | Ta(5 nm)/NiFe(7 nm)/Co(1 nm)/Cu(3 nm)/Co(2 nm)/PtMn(5 nm)/Ta(5 nm) |
| Sample 3-1 | With Thinning Process after Heat Treatment | Ta(5 nm)/NiFe(7 nm)/Co(1 nm)/Cu(3 nm)/Co(2 nm)/PtMn(30 nm) |
| Sample 3-2 | With Thinning Process after Heat Treatment | Ta(5 nm)/NiFe(7 nm)/Co(1 nm)/Cu(3 nm)/Co(2 nm)/PtMn(40 nm) |
| Sample 3-3 | With Thinning Process after Heat Treatment | Ta(5 nm)/NiFe(7 nm)/Co(1 nm)/Cu(3 nm)/Co(2 nm)/PtMn(50 nm) |
| Sample 3-4 | With Thinning Process after Heat Treatment | Ta(5 nm)/NiFe(7 nm)/Co(1 nm)/Cu(3 nm)/Co(2 nm)/PtMn(60 nm) |
| Sample 3-5 | With Thinning Process after Heat Treatment | Ta(5 nm)/NiFe(7 nm)/Co(1 nm)/Cu(3 nm)/Co(2 nm)/PtMn(100 nm) |

FOURTH EXAMPLE

Figure 7:
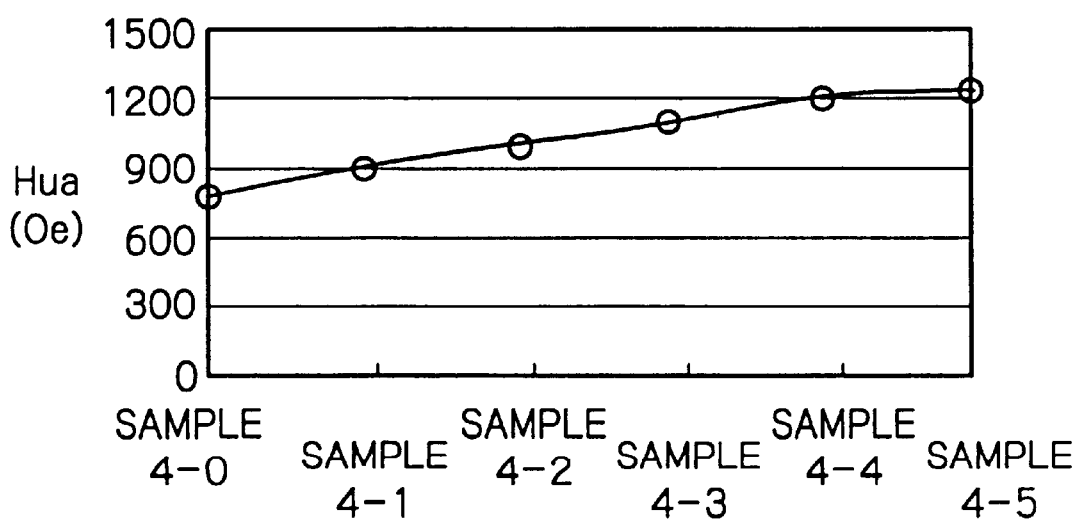
FIG. 7 is a graph illustrating results of measurement of exchange-coupling magnetic field Hua of various samples with anti-ferromagnetic layers having different thickness values at deposition.

FIG. 7 illustrates the measurement results of exchange-coupling magnetic field Hua of the various samples with anti-ferromagnetic layers of PtPdMn. The thickness values at deposition of the anti-ferromagnetic layers in the samples are indicated in Table 4. In this example, the target or final thickness of the anti-ferromagnetic layer was 20 nm, and the composition of PtPdMn was Pt—45 at %, Pd—5 at % and Mn—50 at %.

TABLE 4

| | | Layer Structure at Deposition |
|---|---|---|
| Sample 4-0 | Without Thinning Process after Heat Treatment | Ta(5 nm)/NiFe(7 nm)/Co(1 nm)/Cu(3 nm)/Co(2 nm)/PtPdMn(20 nm)/Ta(5 nm) |
| Sample 4-1 | With Thinning Process after Heat Treatment | Ta(5 nm)/NiFe(7 nm)/Co(1 nm)/Cu(3 nm)/Co(2 nm)/PtPdMn(30 nm) |
| Sample 4-2 | With Thinning Process after Heat Treatment | Ta(5 nm)/NiFe(7 nm)/Co(1 nm)/Cu(3 nm)/Co(2 nm)/PtPdMn(40 nm) |
| Sample 4-3 | With Thinning Process after Heat Treatment | Ta(5 nm)/NiFe(7 nm)/Co(1 nm)/Cu(3 nm)/Co(2 nm)/PtPdMn(50 nm) |
| Sample 4-4 | With Thinning Process after Heat Treatment | Ta(5 nm)/NiFe(7 nm)/Co(1 nm)/Cu(3 nm)/Co(2 nm)/PtPdMn(60 nm) |
| Sample 4-5 | With Thinning Process after Heat Treatment | Ta(5 nm)/NiFe(7 nm)/Co(1 nm)/Cu(3 nm)/Co(2 nm)/PtPdMn(100 nm) |

FIFTH EXAMPLE

Figure 8:
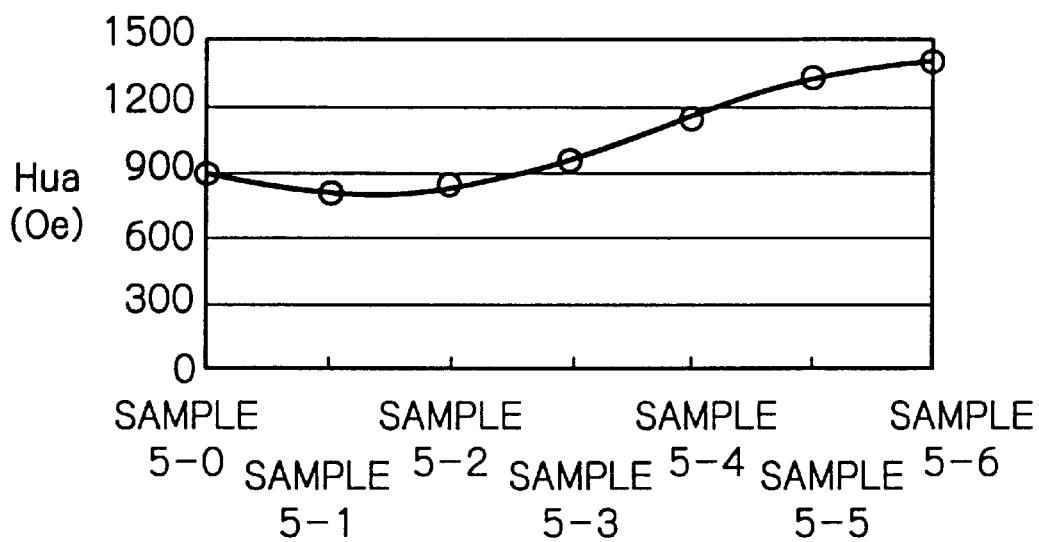
FIG. 8 is a graph illustrating results of measurement of exchange-coupling magnetic field Hua of various samples with anti-ferromagnetic layers having different thickness values at deposition.

FIG. 8 illustrates the measurement results of exchange-coupling magnetic field Hua of the various samples with anti-ferromagnetic layers of PtRuMn. The thickness values at deposition of the anti-ferromagnetic layers in the samples are indicated in Table 5. In this example, the target or final thickness of the anti-ferromagnetic layer was 35 nm, and the composition of PtRuMn was Pt—46 at %, Ru—5 at % and Mn—49 at %.

TABLE 5

| | | Layer Structure at Deposition |
|---|---|---|
| Sample 5-0 | Without Thinning Process after Heat Treatment | Ta(5 nm)/NiFe(7 nm)/Co(1 nm)/Cu(3 nm)/ Co(2 nm)/PtRuMn(35 nm)/Ta(5 nm) |
| Sample 5-1 | With Thinning Process after Heat Treatment | Ta(5 nm)/NiFe(7 nm)/Co(1 nm)/Cu(3 nm)/ Co(2 nm)/PtRuMn(38 nm) |
| Sample 5-2 | With Thinning Process after Heat Treatment | Ta(5 nm)/NiFe(7 nm)/Co(1 nm)/Cu(3 nm)/ Co(2 nm)/PtRuMn(39 nm) |
| Sample 5-3 | With Thinning Process after Heat Treatment | Ta(5 nm)/NiFe(7 nm)/Co(1 nm)/Cu(3 nm)/ Co(2 nm)/PtRuMn(40 nm) |
| Sample 5-4 | With Thinning Process after Heat Treatment | Ta(5 nm)/NiFe(7 nm)/Co(1 nm)/Cu(3 nm)/ Co(2 nm)/PtRuMn(50 nm) |
| Sample 5-5 | With Thinning Process after Heat Treatment | Ta(5 nm)/NiFe(7 nm)/Co(1 nm)/Cu(3 nm)/ Co(2 nm)/PtRuMn(60 nm) |
| Sample 5-6 | With Thinning Process after Heat Treatment | Ta(5 nm)/NiFe(7 nm)/Co(1 nm)/Cu(3 nm)/ Co(2 nm)/PtRuMu(100 nm) |

SIXTH EXAMPLE

Figure 9:
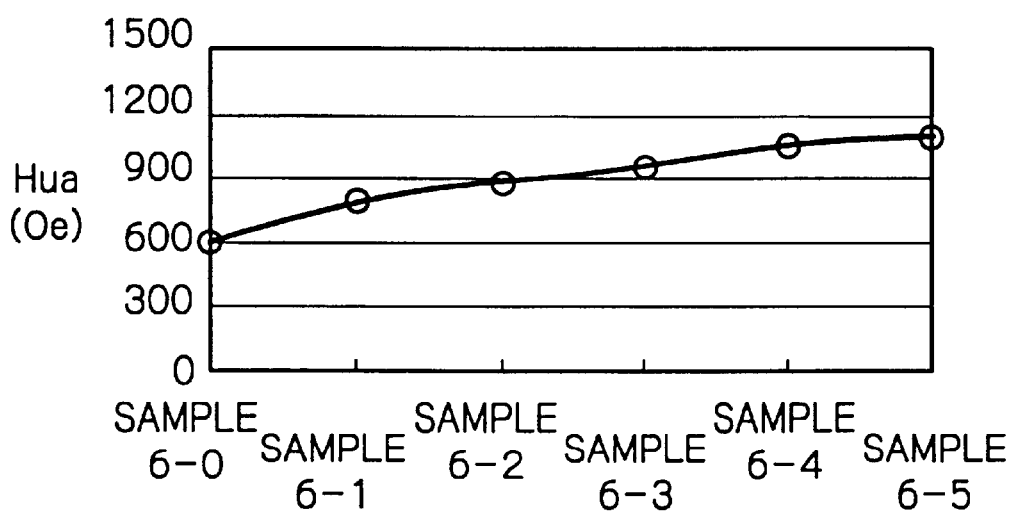
FIG. 9 is a graph illustrating results of measurement of exchange-coupling magnetic field Hua of various samples with anti-ferromagnetic layers having different thickness values at deposition.

FIG. 9 illustrates the measurement results of exchange-coupling magnetic field Hua of the various samples with anti-ferromagnetic layers of PtRhMn. The thickness values at deposition of the anti-ferromagnetic layers in the samples are indicated in Table 6. In this example, the target or final thickness of the anti-ferromagnetic layer was 15 nm, and the composition of PtRhMn was Pt—45 at %, Rh—7 at % and Mn—48 at %.

TABLE 6

| | | Layer Structure at Deposition |
|---|---|---|
| Sample 6-0 | Without Thinning Process after Heat Treatment | Ta(5 nm)/NiFe(7 nm)/Co(1 nm)/Cu(3 nm)/ Co(2 nm)/PtRhMn(15 nm)/Ta(5 nm) |
| Sample 6-1 | With Thinning Process after Heat Treatment | Ta(5 nm)/NiFe(7 nm)/Co(1 nm)/Cu(3 nm)/ Co(2 nm)/PtRhMn(30 nm) |
| Sample 6-2 | With Thinning Process after Heat Treatment | Ta(5 nm)/NiFe(7 nm)/Co(1 nm)/Cu(3 nm)/ Co(2 nm)/PtRhMn(40 nm) |
| Sample 6-3 | With Thinning Process after Heat Treatment | Ta(5 nm)/NiFe(7 nm)/Co(1 nm)/Cu(3 nm)/ Co(2 nm)/PtRhMn(50 nm) |
| Sample 6-4 | With Thinning Process after Heat Treatment | Ta(5 nm)/NiFe(7 nm)/Co(1 nm)/Cu(3 nm)/ Co(2 nm)/PtRhMn(60 nm) |
| Sample 6-5 | With Thinning Process after Heat Treatment | Ta(5 nm)/NiFe(7 nm)/Co(1 nm)/Cu(3 nm)/ Co(2 nm)/PtRhMn(100 nm) |

SEVENTH EXAMPLE

Figure 10:
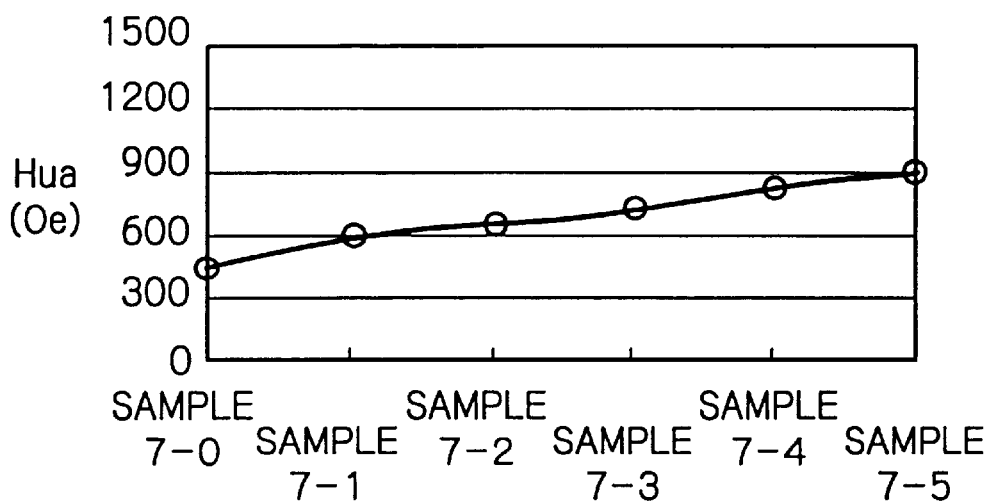
FIG. 10 is a graph illustrating results of measurement of exchange-coupling magnetic field Hua of various samples with anti-ferromagnetic layers having different thickness values at deposition.

FIG. 10 illustrates the measurement results of exchange-coupling magnetic field Hua of the various samples with anti-ferromagnetic layers of PtAuMn. The thickness values at deposition of the anti-ferromagnetic layers in the samples are indicated in Table 7. In this example, the target or final thickness of the anti-ferromagnetic layer was 15 nm, and the composition of PtAuMn was Pt—43 at %, Au—9 at % and Mn—48 at %.

TABLE 7

| | | Layer Structure at Deposition |
|---|---|---|
| Sample 7-0 | Without Thinning Process after Heat Treatment | Ta(5 nm)/NiFe(7 nm)/Co(1 nm)/Cu(3 nm)/ Co(2 nm)/PtAuMn(15 nm)/Ta(5 nm) |
| Sample 7-1 | With Thinning Process after Heat Treatment | Ta(5 nm)/NiFe(7 nm)/Co(1 nm)/Cu(3 nm)/ Co(2 nm)/PtAuMn(30 nm) |
| Sample 7-2 | With Thinning Process after Heat Treatment | Ta(5 nm)/NiFe(7 nm)/Co(1 nm)/Cu(3 nm)/ Co(2 nm)/PtAuMn(40 nm) |
| Sample 7-3 | With Thinning Process after Heat Treatment | Ta(5 nm)/NiFe(7 nm)/Co(1 nm)/Cu(3 nm)/ Co(2 nm)/PtAuMn(50 nm) |
| Sample 7-4 | With Thinning Process after Heat Treatment | Ta(5 nm)/NiFe(7 nm)/Co(1 nm)/Cu(3 nm)/ Co(2 nm)/PtAuMn(60 nm) |
| Sample 7-5 | With Thinning Process after Heat Treatment | Ta(5 nm)/NiFe(7 nm)/Co(1 nm)/Cu(3 nm)/ Co(2 nm)/PtAuMn(100 nm) |

EIGHTH EXAMPLE

Figure 11:
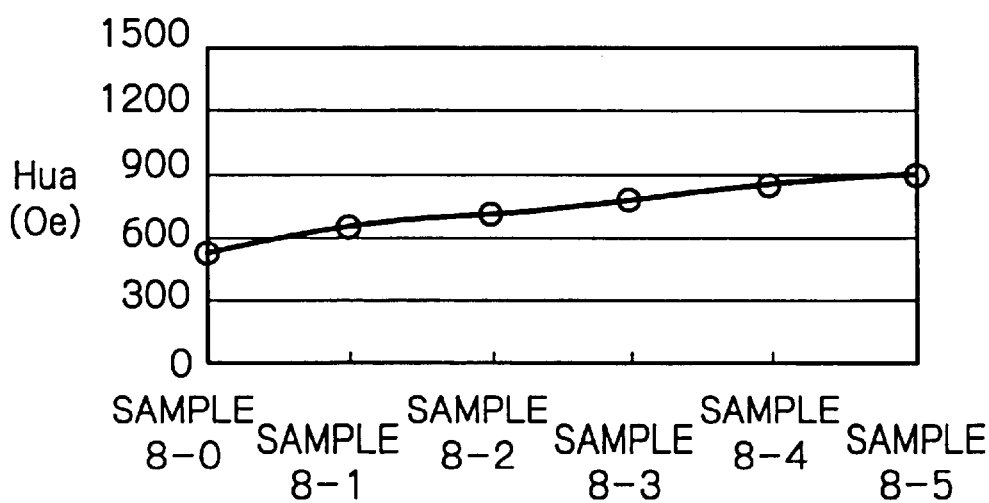
FIG. 11 is a graph illustrating results of measurement of exchange-coupling magnetic field Hua of various samples with anti-ferromagnetic layers having different thickness values at deposition.

FIG. 11 illustrates the measurement results of exchange-coupling magnetic field Hua of the various samples with anti-ferromagnetic layers of NiPtMn. The thickness values at deposition of the anti-ferromagnetic layers in the samples are indicated in Table 8. In this example, the target or final thickness of the anti-ferromagnetic layer was 15 nm, and the composition of NiPtMn was Ni—40 at %, Pt—15 at % and Mn—45 at %.

TABLE 8

| | | Layer Structure at Deposition |
|---|---|---|
| Sample 8-0 | Without Thinning Process after Heat Treatment | Ta(5 nm)/NiFe(7 nm)/Co(1 nm)/Cu(3 nm)/ Co(2 nm)/NiPtMn(15 nm)/Ta(5 nm) |
| Sample 8-1 | With Thinning Process after Heat Treatment | Ta(5 nm)/NiFe(7 nm)/Co(1 nm)/Cu(3 nm)/ Co(2 nm)/NiPtMn(30 nm) |
| Sample 8-2 | With Thinning Process after Heat Treatment | Ta(5 nm)/NiFe(7 nm)/Co(1 nm)/Cu(3 nm)/ Co(2 nm)/NiPtMn(40 nm) |
| Sample 8-3 | With Thinning Process after Heat Treatment | Ta(5 nm)/NiFe(7 nm)/Co(1 nm)/Cu(3 nm)/ Co(2 nm)/NiPtMn(50 nm) |
| Sample 8-4 | With Thinning Process after Heat Treatment | Ta(5 nm)/NiFe(7 nm)/Co(1 nm)/Cu(3 nm)/ Co(2 nm)/NiPtMn(60 nm) |
| Sample 8-5 | With Thinning Process after Heat Treatment | Ta(5 nm)/NiFe(7 nm)/Co(1 nm)/Cu(3 nm)/ Co(2 nm)/NiPtMn(100 nm) |

NINTH EXAMPLE

Figure 12:
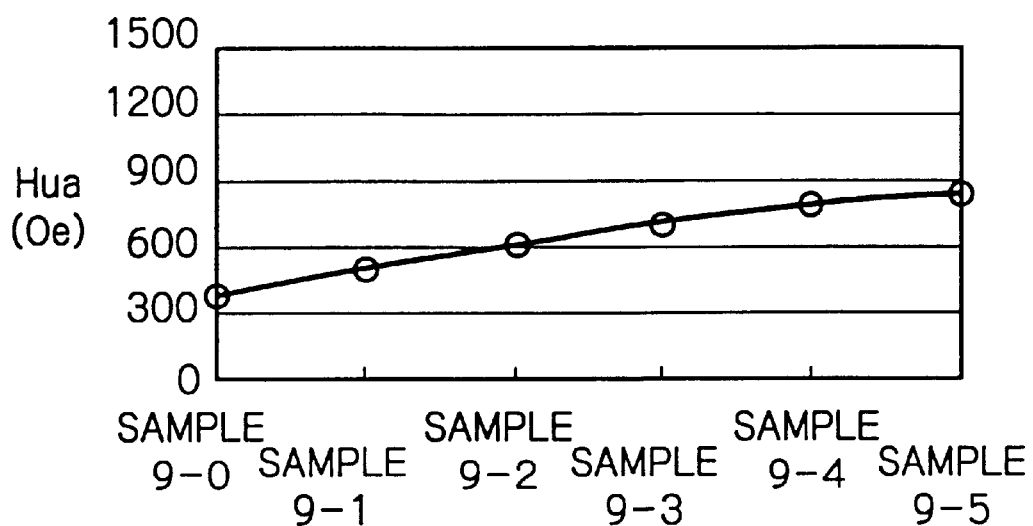
FIG. 12 is a graph illustrating results of measurement of exchange-coupling magnetic field Hua of various samples with anti-ferromagnetic layers having different thickness values at deposition.

FIG. 12 illustrates the measurement results of exchange-coupling magnetic field Hua of the various samples with anti-ferromagnetic layers of NiAgMn. The thickness values at deposition of the anti-ferromagnetic layers in the samples are indicated in Table 9. In this example, the target or final thickness of the anti-ferromagnetic layer was 15 nm, and the composition of NiAgMn was Ni—45 at %, Ag—5 at % and Mn—45 at %.

TABLE 9

| | | Layer Structure at Deposition |
|---|---|---|
| Sample 9-0 | Without Thinning Process after Heat Treatment | Ta(5 nm)/NiFe(7 nm)/Co(1 nm)/Cu(3 nm)/Co(2 nm)/NiAgMn(15 nm)/Ta(5 nm) |
| Sample 9-1 | With Thinning Process after Heat Treatment | Ta(5 nm)/NiFe(7 nm)/Co(1 nm)/Cu(3 nm)/Co(2 nm)/NiAgMn(30 nm) |
| Sample 9-2 | With Thinning Process after Heat Treatment | Ta(5 nm)/NiFe(7 nm)/Co(1 nm)/Cu(3 nm)/Co(2 nm)/NiAgMn(40 nm) |
| Sample 9-3 | With Thinning Process after Heat Treatment | Ta(5 nm)/NiFe(7 nm)/Co(1 nm)/Cu(3 nm)/Co(2 nm)/NiAgMn(50 nm) |
| Sample 9-4 | With Thinning Process after Heat Treatment | Ta(5 nm)/NiFe(7 nm)/Co(1 nm)/Cu(3 nm)/Co(2 nm)/NiAgMn(60 nm) |
| Sample 9-5 | With Thinning Process after Heat Treatment | Ta(5 nm)/NiFe(7 nm)/Co(1 nm)/Cu(3 nm)/Co(2 nm)/NiAgMn(100 nm) |

TENTH EXAMPLE

Figure 13:
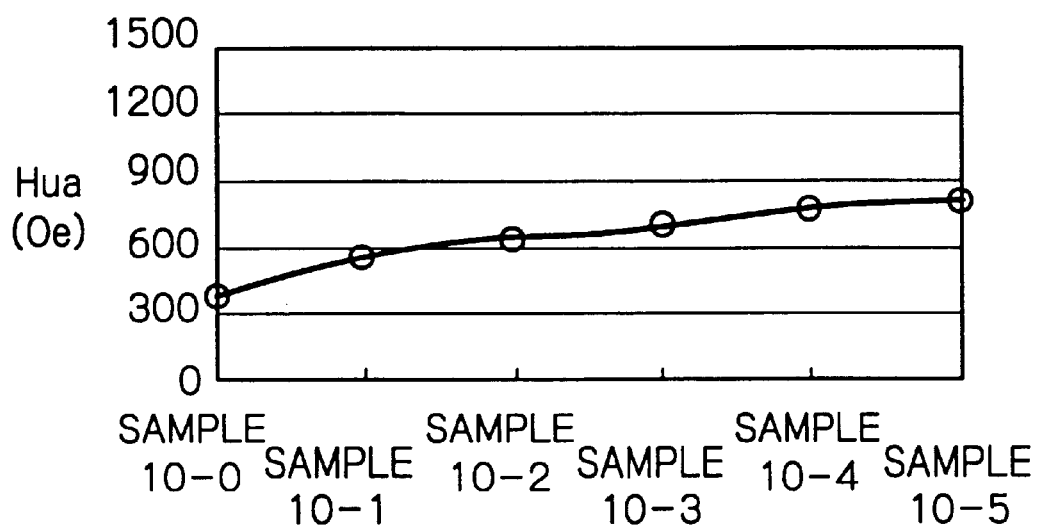
FIG. 13 is a graph illustrating results of measurement of exchange-coupling magnetic field Hua of various samples with anti-ferromagnetic layers having different thickness values at deposition.

FIG. 13 illustrates the measurement results of exchange-coupling magnetic field Hua of the various samples with anti-ferromagnetic layers of NiFeMn. The thickness values at deposition of the anti-ferromagnetic layers in the samples are indicated in Table 10. In this example, the target or final thickness of the anti-ferromagnetic layer was 15 nm, and the composition of NiFeMn was Ni—45 at %, Fe—5 at % and Mn—50 at %.

TABLE 10

| | | Layer Structure at Deposition |
|---|---|---|
| Sample 10-0 | Without Thinning Process after Heat Treatment | Ta(5 nm)/NiFe(7 nm)/Co(1 nm)/Cu(3 nm)/Co(2 nm)/NiFeMn(15 nm)/Ta(5 nm) |
| Sample 10-1 | With Thinning Process after Heat Treatment | Ta(5 nm)/NiFe(7 nm)/Co(1 nm)/Cu(3 nm)/Co(2 nm)/NiFeMn(30 nm) |
| Sample 10-2 | With Thinning Process after Heat Treatment | Ta(5 nm)/NiFe(7 nm)/Co(1 nm)/Cu(3 nm)/Co(2 nm)/NiFeMn(40 nm) |
| Sample 10-3 | With Thinning Process after Heat Treatment | Ta(5 nm)/NiFe(7 nm)/Co(1 nm)/Cu(3 nm)/Co(2 nm)/NiFeMn(50 nm) |
| Sample 10-4 | With Thinning Process after Heat Treatment | Ta(5 nm)/NiFe(7 nm)/Co(1 nm)/Cu(3 nm)/Co(2 nm)/NiFeMn(60 nm) |
| Sample 10-5 | With Thinning Process after Heat Treatment | Ta(5 nm)/NiFe(7 nm)/Co(1 nm)/Cu(3 nm)/Co(2 nm)/NiFeMn(100 nm) |

ELEVENTH EXAMPLE

Figure 14:
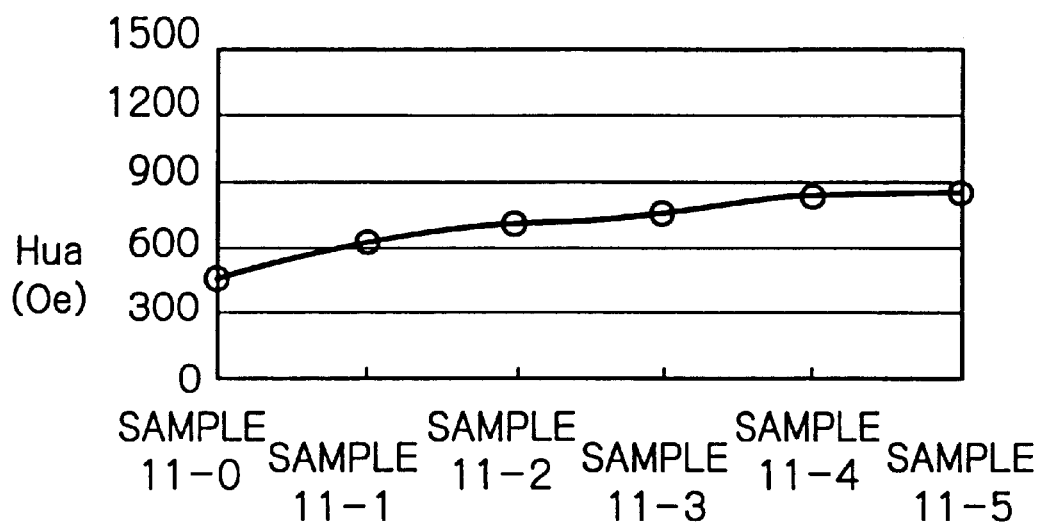
FIG. 14 is a graph illustrating results of measurement of exchange-coupling magnetic field Hua of various samples with anti-ferromagnetic layers having different thickness values at deposition.

FIG. 14 illustrates the measurement results of exchange-coupling magnetic field Hua of the various samples with anti-ferromagnetic layers of PtCrMn. The thickness values at deposition of the anti-ferromagnetic layers in the samples are indicated in Table 11. In this example, the target or final thickness of the anti-ferromagnetic layer was 15 nm, and the composition of PtCrMn was Pt—43 at %, Cr—9 at % and Mn—48 at %.

TABLE 11

| | | Layer Structure at Deposition |
|---|---|---|
| Sample 11-0 | Without Thinning Process after Heat Treatment | Ta(5 nm)/NiFe(7 nm)/Co(1 nm)/Cu(3 nm)/Co(2 nm)/PtCrMn(15 nm)/Ta(5 nm) |
| Sample 11-1 | With Thinning Process after Heat Treatment | Ta(5 nm)/NiFe(7 nm)/Co(1 nm)/Cu(3 nm)/Co(2 nm)/PtCrMn(30 nm) |
| Sample 11-2 | With Thinning Process after Heat Treatment | Ta(5 nm)/NiFe(7 nm)/Co(1 nm)/Cu(3 nm)/Co(2 nm)/PtCrMn(40 nm) |
| Sample 11-3 | With Thinning Process after Heat Treatment | Ta(5 nm)/NiFe(7 nm)/Co(1 nm)/Cu(3 nm)/Co(2 nm)/PtCrMn(50 nm) |
| Sample 11-4 | With Thinning Process after Heat Treatment | Ta(5 nm)/NiFe(7 nm)/Co(1 nm)/Cu(3 nm)/Co(2 nm)/PtCrMn(60 nm) |
| Sample 11-5 | With Thinning Process after Heat Treatment | Ta(5 nm)/NiFe(7 nm)/Co(1 nm)/Cu(3 nm)/Co(2 nm)/PtCrMn(100 nm) |

TWELFTH EXAMPLE

Figure 15:
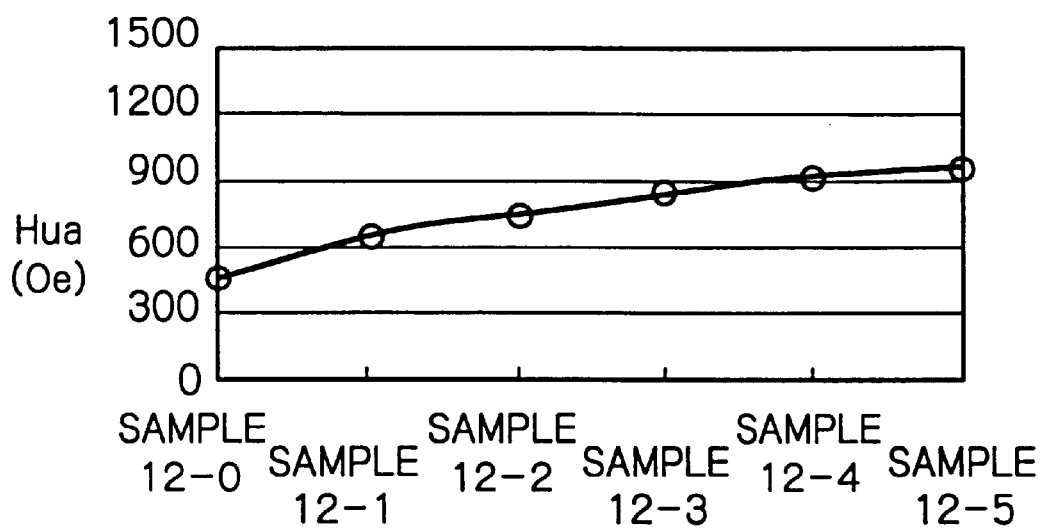
FIG. 15 is a graph illustrating results of measurement of exchange-coupling magnetic field Hua of various samples with anti-ferromagnetic layers having different thickness values at deposition.

FIG. 15 illustrates the measurement results of exchange-coupling magnetic field Hua of the various samples with anti-ferromagnetic layers of NiRuMn. The thickness values at deposition of the anti-ferromagnetic layers in the samples are indicated in Table 12. In this example, the target or final thickness of the anti-ferromagnetic layer was 15 nm, and the composition of NiRuMn was Ni—43 at %, Ru—9 at % and Mn—48 at %.

TABLE 12

| | | Layer Structure at Deposition |
|---|---|---|
| Sample 12-0 | Without Thinning Process after Heat Treatment | Ta(5 nm)/NiFe(7 nm)/Co(1 nm)/Cu(3 nm)/Co(2 nm)/NiRuMn(15 nm)/Ta(5 nm) |
| Sample 12-1 | With Thinning Process after Heat Treatment | Ta(5 nm)/NiFe(7 nm)/Co(1 nm)/Cu(3 nm)/Co(2 nm)/NiRuMn(30 nm) |
| Sample 12-2 | With Thinning Process after Heat Treatment | Ta(5 nm)/NiFe(7 nm)/Co(1 nm)/Cu(3 nm)/Co(2 nm)/NiRuMn(40 nm) |
| Sample 12-3 | With Thinning Process after Heat Treatment | Ta(5 nm)/NiFe(7 nm)/Co(1 nm)/Cu(3 nm)/Co(2 nm)/NiRuMn(50 nm) |
| Sample 12-4 | With Thinning Process after Heat Treatment | Ta(5 nm)/NiFe(7 nm)/Co(1 nm)/Cu(3 nm)/Co(2 nm)/NiRuMn(60 nm) |
| Sample 12-5 | With Thinning Process after Heat Treatment | Ta(5 nm)/NiFe(7 nm)/Co(1 nm)/Cu(3 nm)/Co(2 nm)/NiRuMn(100 nm) |

As will be apparent from FIGS. 4 to 15, the thicker of the anti-ferromagnetic layer at deposition, namely the greater of the thinning amount of the anti-ferromagnetic layer after ordering, the larger exchange-coupling magnetic field Hua can be obtained even if the anti-ferromagnetic layer has the target thickness. As a result, the exchange-coupling energy between the ferromagnetic layer and the anti-ferromagnetic layer of the spin valve structure can be increased without changing or increasing the thickness of the anti-ferromagnetic layer so as to keep the divided sense current passing through the anti-ferromagnetic layer at almost the same value and so as to maintain the output characteristics of the MR sensor.

As will be understood from FIGS. 4 and 8, if the amount of thinning of the anti-ferromagnetic layer is less than 5 nm, the exchange-coupling magnetic field Hua in the spin valve structure becomes smaller than that of the structure with the anti-ferromagnetic layer formed by executing no thinning process. This is because a certain region near the surface (from the surface to a depth of 5 nm or more) of the anti-ferromagnetic layer becomes a dead region for operating as an anti-ferromagnetic layer due to oxidation and thus the dead region will not be completely removed if the thinning amount is less than 5 nm. Therefore, it is desired that, in the thinning process, the anti-ferromagnetic layer is thinned by 5 nm or more.

Also, it is desired that the anti-ferromagnetic layer is formed by a Mn-containing compound that has the CuAu—I type ordered crystal structure and is oriented along (111) crystal alignment face after ordering.

The Mn-containing compound is preferably an alloy that contains 80 at % or more of PtMn and additive of at least one of Ru, Rh, Pd, Au, Ag, Fe and Cr. Content of Mn in PtMn should be 40 to 60 at %. If the content of Mn is out of this range, ordered crystal structure cannot be formed in general and thus anti-ferromagnetic property cannot be expected.

The Mn-containing compound is also preferably an alloy that contains 80 at % or more of NiMn and additive of at least one of Ru, Rh, Pd, Au, Ag, Fe and Cr. Content of Mn in NiMn should be 40 to 60 at %. If the content of Mn is out of this range, ordered crystal structure cannot be formed in general and thus anti-ferromagnetic property cannot be expected.

As mentioned before, according to the present invention, an anti-ferromagnetic layer is deposited to have a larger thickness than a target thickness, then ordered and thereafter thinned to have the target thickness. Thus, it is possible to obtain a multi-layered MR structure with a larger exchange-coupling energy than that of a multi-layered MR structure in which an anti-ferromagnetic layer is deposited to have the target thickness from the beginning and ordered. As a result, according to the present invention, the exchange-coupling energy between the ferromagnetic layer and the anti-ferromagnetic layer of the multi-layered MR structure can be increased without changing or increasing the thickness of the anti-ferromagnetic layer so as to keep the divided sense current passing through the anti-ferromagnetic layer at almost the same value and so as to maintain the output characteristics of the MR sensor.

Many widely different embodiments of the present invention may be constructed without departing from the spirit and scope of the present invention. It should be understood that the present invention is not limited to the specific embodiments described in the specification, except as defined in the appended claims.

What is claimed is:

1. A method of manufacturing a magnetoresistive effect sensor with a giant magnetoresistive effect multi-layered sensing structure having at least an anti-ferromagnetic layer and a ferromagnetic layer that is to be exchange-coupled with said anti-ferromagnetic layer, said method comprising the steps of:

depositing the ferromagnetic layer of said multi-layered sensing structure;

depositing on said ferromagnetic layer, the anti-ferromagnetic layer of said multi-layered sensing structure to have a larger thickness than a target thickness;

ordering said deposited anti-ferromagnetic layer; and thinning said ordered deposited anti-ferromagnetic layer over a whole region where the anti-ferromagnetic layer contacts to said ferromagnetic layer, to have the target thickness, such that a magnetic exchange coupling between the anti-ferromagnetic layer and the ferromagnetic layer remains.

2. The method as claimed in claim 1, wherein said thinning step includes thinning said ordered anti-ferromagnetic layer by a thinning amount of 5 nm or more.

3. The method as claimed in claim 1, wherein said depositing of the anti-ferromagnetic layer includes depositing a Mn-containing compound with a CuAu—I type ordered crystal structure.

4. The method as claimed in claim 3, wherein said method further comprises the step of orienting said ordered anti-ferromagnetic layer along (111) crystal alignment face after said ordering.

5. The method as claimed in claim 1, wherein said depositing of the anti-ferromagnetic layer includes depositing PtMn.

6. The method as claimed in claim 5, wherein said depositing of the anti-ferromagnetic layer includes depositing a content of Mn in PtMn of 40 to 60 at %.

7. The method as claimed in claim 1, wherein said depositing of the anti-ferromagnetic layer includes depositing an alloy containing 80 at % or more of PtMn and additive of at least one of Ru, Rh, Pd, Au, Ag, Fe and Cr.

8. The method as claimed in claim 1, wherein said depositing of the anti-ferromagnetic layer includes depositing NiMn.

9. The method as claimed in claim 8, wherein depositing of the anti-ferromagnetic layer includes depositing a content of Mn in NiMn that is 40 to 60 at %.

10. The method as claimed in claim 1, wherein depositing of said anti-ferromagnetic layer includes depositing 80 at % or more of NiMn and additive of at least one of Ru, Rh, Pd, Au, Ag, Fe and Cr.

* * * * *